United States Patent [19]
Dumbrava

[11] Patent Number: 5,226,754
[45] Date of Patent: Jul. 13, 1993

[54] SPHERICAL JOINT

[75] Inventor: Florian G. Dumbrava, Bucharest, Romania

[73] Assignee: Victor Lavrov, Garden Grove, Calif.

[21] Appl. No.: 881,538

[22] Filed: May 12, 1992

[30] Foreign Application Priority Data

Jan. 20, 1992 [RO] Romania .................. 149281

[51] Int. Cl.$^5$ .............................................. F16C 11/00
[52] U.S. Cl. ........................................ 403/125; 403/39
[58] Field of Search ................... 403/124, 125, 126, 39

[56] References Cited

U.S. PATENT DOCUMENTS

| 2,452,247 | 10/1948 | Larsh | 403/125 |
| 2,926,975 | 3/1960 | Karde et al. | 403/39 X |
| 4,347,014 | 8/1982 | Smith | 403/125 X |

Primary Examiner—Randolph A. Reese
Assistant Examiner—Anthony Knight
Attorney, Agent, or Firm—Ladas & Parry

[57] ABSTRACT

A spherical joint has an upper bearing assembly, a main supporting body, a lower bearing assembly, a linking body for linking the main supporting body and the lower bearing assembly, and an enclosing assembly. Four active hemispherical surfaces are defined. The upper bearing assembly has an active convex surface which, together with an active internal surface of the main supporting body forms an internal coupling. The external convex surface of the main supporting body cooperates with a concave active surface of the lower bearing assembly to define an internal coupling. The external and internal couplings compensate and adjust for wear and any deviation in concentricity between the couplings. The active surface of the lower bearing assembly is comprised a number of spring-loaded lobes equispaced from each other, and is covered with anti-friction material. The pumping effect generated by the oscillating movement of the main supporting body creates a forced lubrication between the active surfaces defining the internal and external couplings.

17 Claims, 8 Drawing Sheets fig. 1 fig. 2 fig. 3 fig. 4 fig. 5 fig. 6 fig. 7 fig. 8

SPHERICAL JOINT

FIELD AND BACKGROUND OF THE INVENTION

The present invention relates to a spherical joint comprised of a cup-shaped main supporting body with two spherical surfaces arranged concentrically, and an upper and a lower bearing body. The spherical joint can be utilized in the construction of suspension systems, steering systems, as well as in the construction of engine piston rods and piston bodies having a built in combustion chamber.

An important part of research and development work, particularly for vehicle construction, is concerned with the creation of a light and compact joint, capable of continuously compensating for wear and for deviation from concentricity.

In U.S. Pat. Nos. 4,347,014, 3,689,100 and 4,511,276, there is disclosed spherical joints which consist of a cup-shaped main supporting body, an upper bearing body and a lower bearing body. The upper and the lower bearing bodies are constructed so the concave surface of the cup-shaped main supporting body forms an external coupling with the convex surface of the upper bearing body which may be covered with an antifriction material, and the convex surface of the cup-shaped main supporting body forms an internal coupling with the concave surface of the lower bearing body which may be covered with an antifriction material. Such spherical joints have some disadvantages. For example, they are built primarily of massive bodies manufactured mainly by using traditional machining processes with high energy and material consumption, and compensate for wear only in the direction of the longitudinal axis. Further, they do not compensate for deviations from concentricity between internal and external couplers and none of them has forced lubrication. The failure to compensate for the wear in all planes or directions, and for deviations from concentricity, as well as absence of forced lubrication, results in the decrease in durability of this kind of joint.

In Romanian Patent No. 100,789, there is described a spherical joint used as a cylindrical joint for connecting the piston with the piston rod using a cup-shaped solid of revolution which is a part of the piston rod, peripherally concave and convex, forming external and internal couplers with the mating surfaces belonging to an upper bearing body being the bottom part of the combustion chamber and to a lower bearing body which is threaded to the skirt piston of the piston and is blocked in position with a nut. Such a spherical joint has the disadvantage of a massive construction using machining processes with a high energy and material consumption. Furthermore, they are not capable of compensating for wear and deviation from concentricity in any direction.

SUMMARY OF THE INVENTION

It is an object of this invention to increase the durability of the spherical joints, accomplished by compensating for the wear and deviations from concentricity using an active surface of the external coupler built to possess elastic properties, being provided with a number of lobes held together by a spring. Another way to increase the durability is the use of forced lubrication realized by the oscillating movement of the main supporting body.

Another object of this invention is to reduce the overall dimensions and mass of the spherical joint by using membrane bodies which are lighter than massive ones.

The present invention also accomplishes the decrease in wear by manufacturing of the membrane bodies through mechanical processes other than machining.

Other objects and advantages of the present invention will appear more clearly from the following description in conjunction with the accompanying drawings wherein like numerals refer to like or equivalent parts.

DETAILED DESCRIPTION OF THE PREFERRED EMBODIMENTS

The spherical joint, according to the present invention consists of a main supporting body, a lower bearing assembly, an upper bearing assembly and a closing assembly, all linked together by connecting elements.

Figure 1:
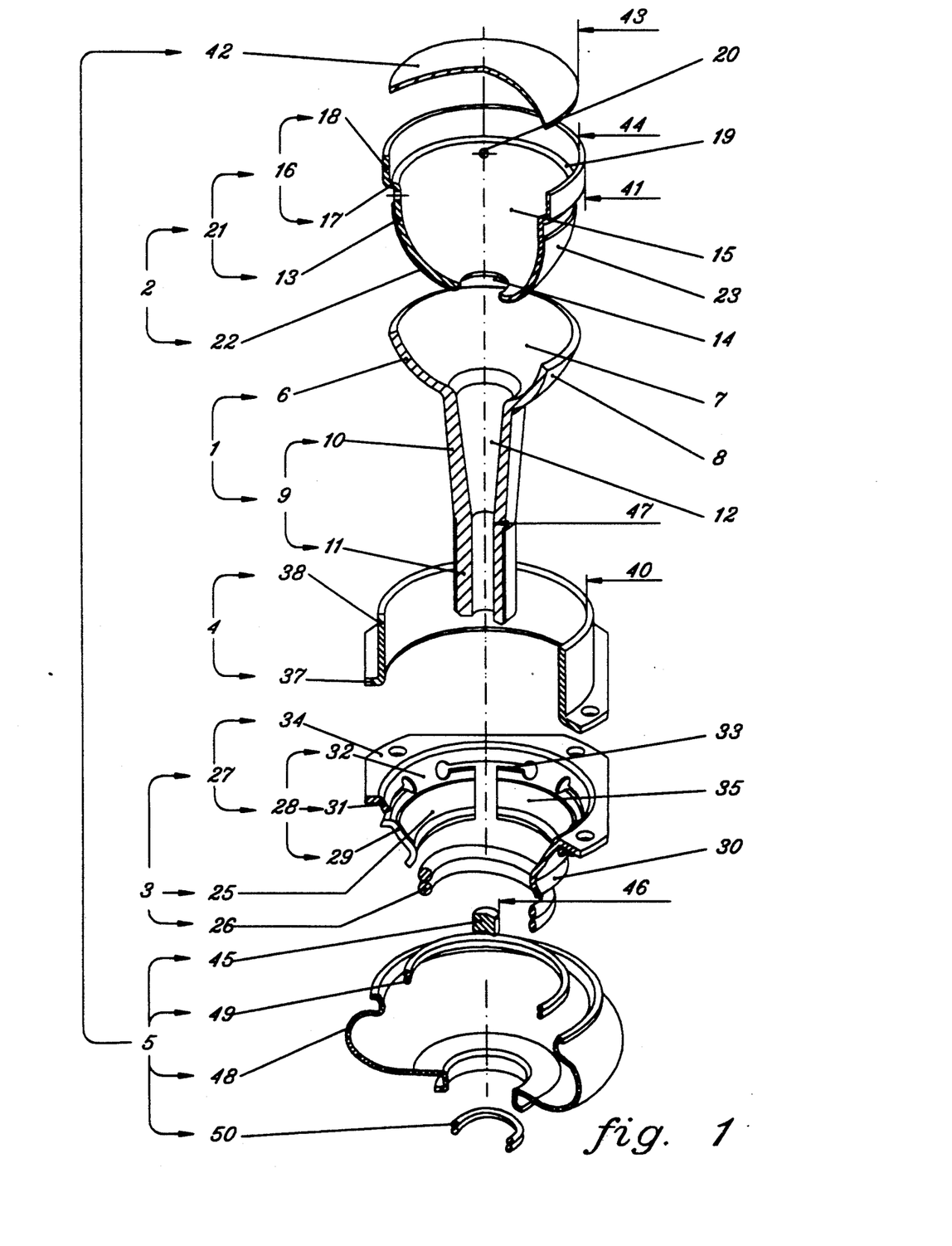
FIG. 1 is an exploded view of a first embodiment of a spherical joint.
Figure 2:
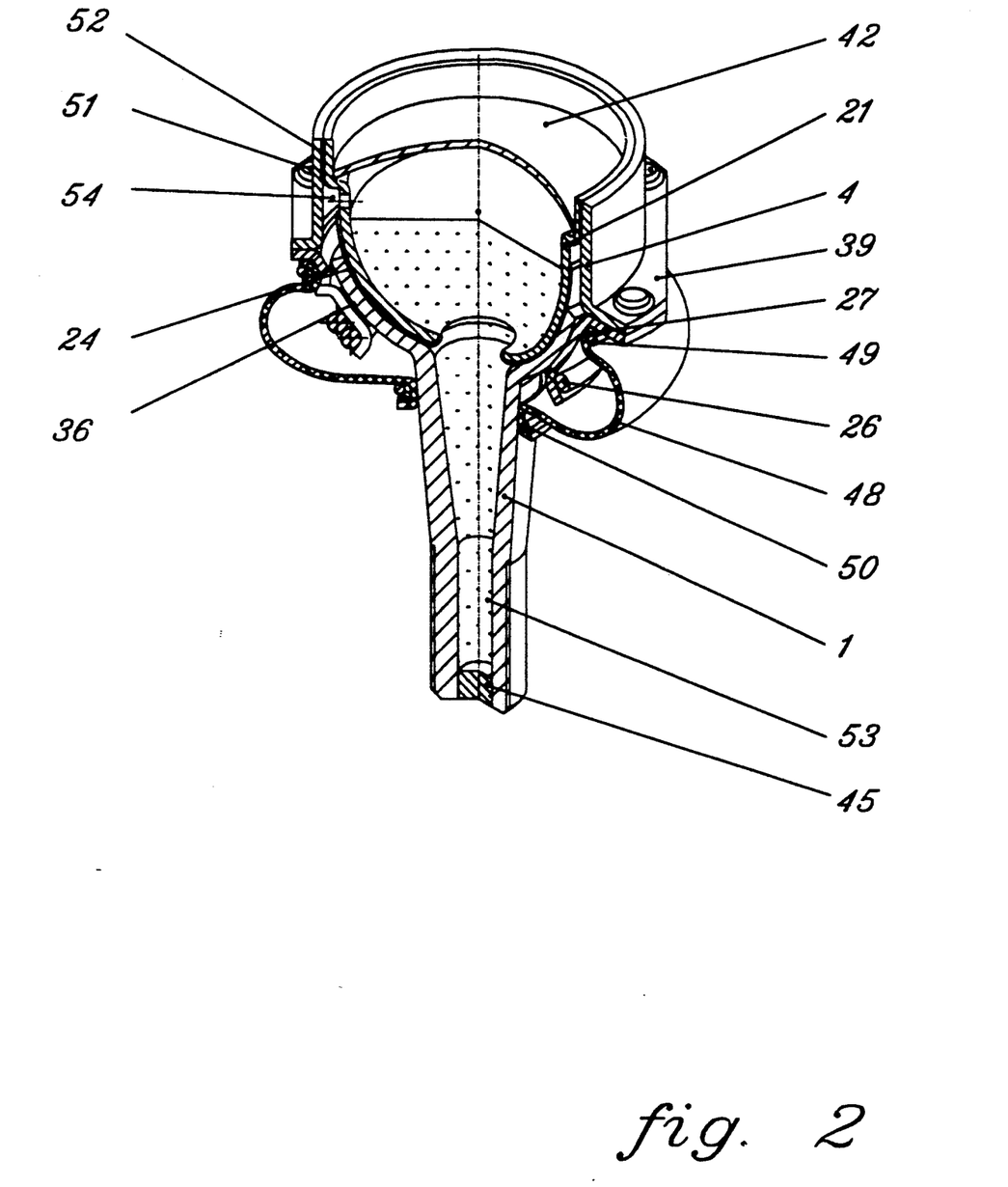
FIG. 2 is a side elevation view partly in section of the assembled spherical joint according to FIG. 1.

In the first preferred embodiment shown in FIGS. 1 and 2, the spherical joint can work in an open environment and with internal forced lubrication, for example, as a ball joint, functioning as a supporting or as ball joint used in steering systems.

The spherical joint consists of a main supporting body 1, an upper bearing assembly 2, a lower bearing assembly 3, a linking body 4 and an enclosing assembly 5.

The main supporting body is comprised of membrane type material with thin walls and is rendered into its final shape from a tubular type product through plastic deformation processes. This main supporting body 1 comprises a cup-shaped supporting section 6 which bears a load at the spherical joint level. The cup-shaped supporting section 6 has an active internal surface 7 and an active external surface 8 of hemispherical shape. Both surfaces 7 and 8 are concentric with each other. The cup-shaped supporting section 6 has on its convex side a connecting stud 9 which facilitates mounting to outside systems, to be described. The stud 9 is provided with a conical shank 10 having a threaded end 11 used for connection to outside systems. An internal cavity 12 is used for lubricant storage.

The upper bearing assembly 2 comprises an upper bearing body 21 covered with an antifriction material 22 on the outside thereof.

The upper bearing body 21 is made of membrane type material with thin walls and is rendered into its final shape from a tubular type product or from sheet metal through plastic deformation processes or metal stamping. This upper bearing body 21 has a cup-shaped supporting section 13 provided at its lower side with a window 14 and an internal cavity 15 which acts as a lubricant storage. The supporting section 13 has at its upper edge a mounting section 16, which comprises a radial flange 17 and a cylindrical flange 18 which functions as a mount. Between flanges 17 and 18, there is a step 19. In the wall of the supporting section 13, there are a number of radial holes 20 to facilitate the lubricant transfer. The convex external peripheral side of the upper bearing body 21, covered with the antifriction material 22, results in an active convex surface 23 of the upper bearing assembly 2. The active surface 23 engages the active concave surface 7 of the main supporting body 1 resulting in an open hemispherical external coupling 24.

The lower bearing assembly 3 comprises a lower bearing body 27 having a number of sectors covered with an antri-friction material 25 and a radial spring 26. The lower bearing body 27 is of membrane type material with thin walls and is rendered into its final shape from a sheet metal through plastic deformation processes and metal stamping. This body 27 has a cup-shaped supporting section 28 with elastic properties including a number of equispaced lobes 29 with hemispherical shape. Each lobe 29 is provided with a step 30 for the retaining of spring 26. Each lobe 29 is connected at its upper side to a common portion 31 of the body 27 by means of a flexible zone 32 facilitating the oscillation of lobe 29. The lobes 29 also define at their upper side formations 33 radially spaced on the convex side. The supporting section 28 has at its upper side a mounting flange 34. The lobes 29 are covered on their concave sides with antifriction material 25, resulting in an active hemispherical surface 35 of the lower bearing assembly 3. The active surface 35 engages the active convex surface 8 of the main supporting body 1 resulting in an hemispherical internal coupling 36, which is concentric, open and faces the external coupling 24. The spring 26 is mounted on the convex side of the supporting section 28 on its steps 30. The diameter of the spring, the number of coils, and the tightening force thereof, are determined to ensure that a radial force acts uniformly on the lobes 29 and results in continuous tightening.

The linking body 4 is rendered into its final shape from a tubular type product or sheet-metal through plastic deformation processes and metal stamping and has a mounting flange 37 and an upper cylindrical mounting section 38. The mounting flange 37 registers with the mounting flange 34 of the lower bearing body 27, permitting their assembly and resulting in a new mounting flange 39 which enables the connecting of the entire assembly of the spherical joint to outside systems. The mounting section 38 is cylindrical and has an internal diameter 40 which corresponds to the external diameter 41 of the cylindrical flange 18 of the mounting section 16 of the upper bearing body 21. The mounting section 38 also enables assembly of the linking body 4 with the upper bearing body 21. Thus, assembly of the upper bearing assembly 2 with the lower bearing assembly 3 can occur, resulting in the registering in the working position of the active surfaces 23 and 35 with the active surfaces 7 and 8 respectively of the main supporting body 1, thus generating a closed hemispherical joint.

Each active surface 7, 8, 23, and 35 is of hemispherical shape and permits active surfaces 7 and 22 and 8 and 35 respectively to be in contact with each other on a greater supporting surface. The contact zone is displaced as far as possible from the axis for any angular position imposed by the driving system acting through the stud 9 of the main supporting body 1, and reacts and compensates for wear at the external and internal couplings 24 and 36, through axial movement of the active surfaces towards each other.

The enclosing assembly 5 contains a dome shaped cover 42 with elastic properties and an external diameter 43 corresponding to an internal diameter 44 of the cylindrical flange 18 of the upper bearing body 21. A plug 45 with an external diameter 46 corresponds with the internal diameter 47 of the threaded end 11. The plug 45, a rubber bellows 48, an upper elastic ring 49 and a lower elastic ring 50, all provide protection against the environment.

The assembling of the spherical joint begins with plugging the internal cavity 12 with the plug 45 at the threaded end 11, and continues with the fixing of the flange 37 on the flange 34 by rivets 51 welding or brazing, thereby obtaining a working assembly of the lower bearing body 27 and the linking body 4. Next, the main supporting body 1 is inserted until the active convex surface 8 is in contact with the concave surface 35 of the lower bearing body 27, generating an internal coupling 36. Thereafter, the upper bearing body 21 is mounted until the active convex surface 23 makes contact with the active concave surface 7 of the main supporting body 1, generating the external coupling 24. In this way, the linking body 4 and the upper bearing body 21 are joined at the diameters 40 and 41 by a welding 52 or brazing.

The assembling is continued with the mounting of the radial spring 26 in an upper position on the convex side of the lobes 29 on the steps 30. The internal cavity 15 and the internal cavity 12 are then filled with lubricant 53 extending from the plug 45 to the level of the holes 20. The mounting of the dome shaped cover 42 in the cylindrical flange 18 on the step 19 closes the spherical joint at the upper cover end. The lower end of the spherical joint is then closed using the rubber bellow 48 by fixing it with elastic rings 49 and 50.

The supporting section 28 of the lower bearing body 27 has elastic characteristics because each of the lobes 29 may oscillate about its axis, having an origin in the flexible zone 32. At the same time, the lobes 29 may modify their curvatures due to their own radial flexibility when acted upon by the force of the radial spring 26. These movements of the lobes 29 generate a hemispherical active surface which continuously compensates for the wear and deviation from concentricity between the active surfaces of the external and internal couplings 24 and 36.

The forced lubrication in the spherical joint is realized in a circulating system which includes the internal cavities 15 and 12, and a toroidal chamber 54 situated above internal coupling 36. The lubricant 53 has the maximum level when situated above the external coupler 24, and circulates through window 14 between the active surfaces 23 and 7 of the external coupler 24 creating a moving lubricating film. This is due to the difference in level between internal cavity 15 and toroidal cavity 54, and the continuing movement of the active surfaces 23 and 7. Lubricant circulates through the external coupling 24 and accumulates in the toroidal chamber 54 from which some lubricant is recirculated through the internal cavity 15, which acts as a storage space for the lubricant 53, and through the holes 20.

Because of the pumping effect created by the oscillating movement of supporting section 6 of the main supporting body 1, the lubricant 53 is circulated from one side to the other of the toroidal chamber 54 resulting in the lubrication of the active surfaces 35 and 8 of the internal coupler 36. The moving lubricating film formed between the active surfaces 35 and 8 goes through internal coupling 36 and accumulates in the rubber bellow 48 which acts as another storage space for the lubricant.

The spherical joint can be assembled in such a way that it may be dismantled at the level of the common flange 39. The spherical joint can also be rigidly assembled to an outside system through the mounting flanges 37 and 34 or 39.

Figure 3:
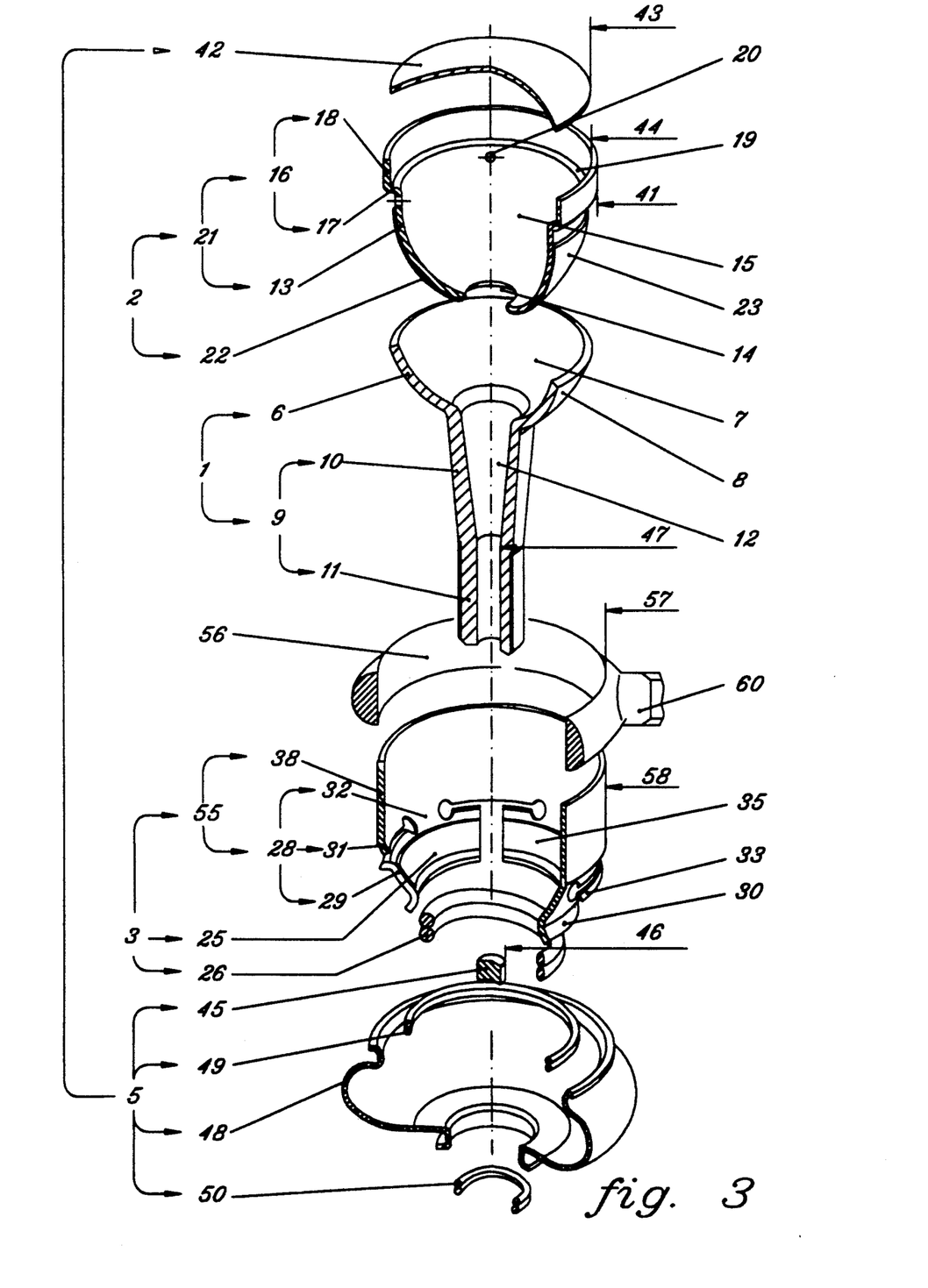
FIG. 3 is an exploded view of the spherical joint shown in FIG. 1 including a ball joint used in steering systems.
Figure 4:
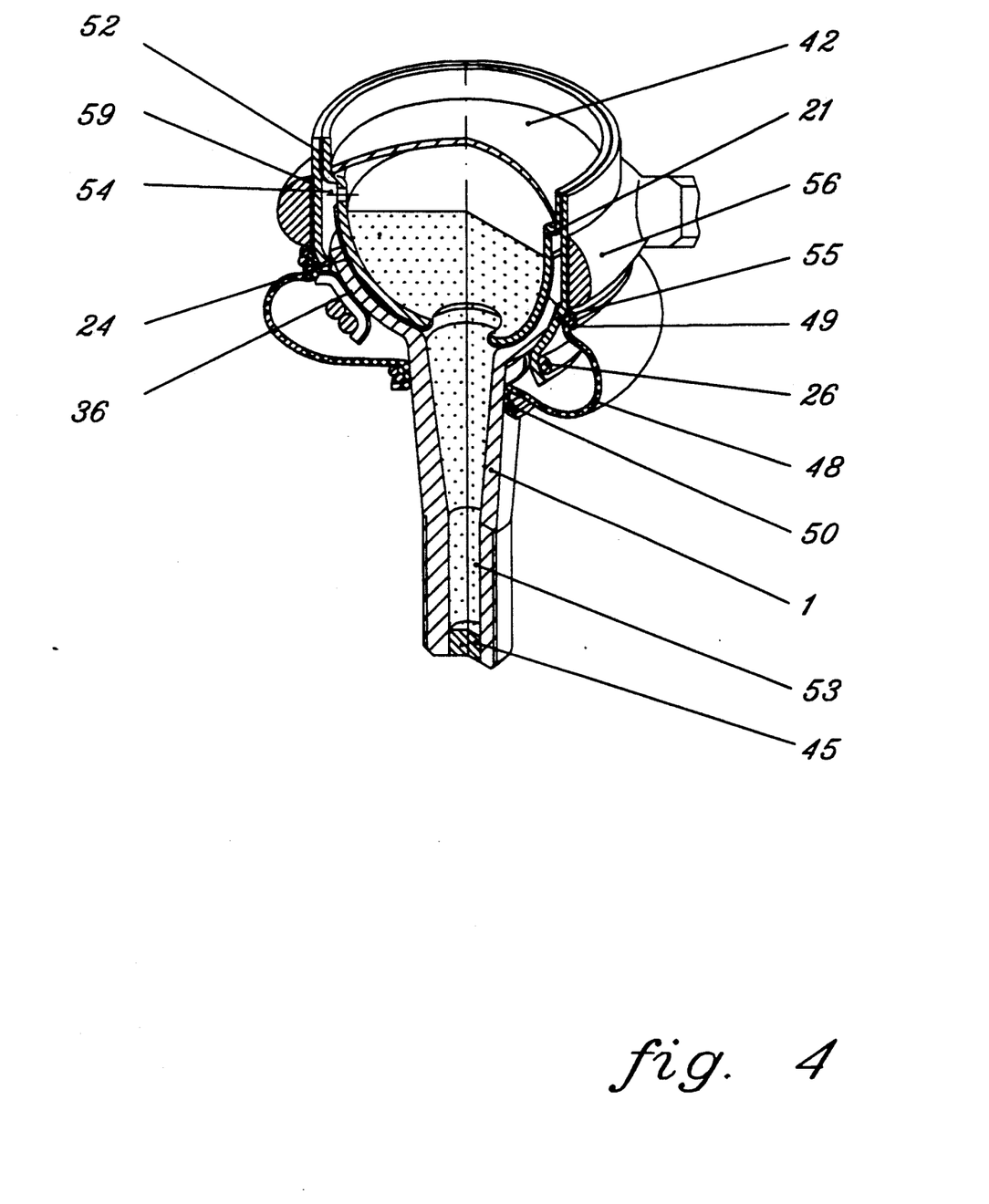
FIG. 4 is a side elevation view partly in section of an assembled spherical joint according to FIG. 3.

Another preferred embodiment of the spherical joint is shown in FIGS. 3-4. The linking body 4 and the lower bearing body 27 from the previous example are modified by converting the flanges 34 and 37, into a single body 55, which also has a linking function. In this case, the spherical joint is connected to the outside system with the help of a ring 56 connected to the linking body 55. The ring 56 has an internal diameter 57 and corresponds with the external diameter 58 of the linking body 55. The ring 56 is rigidly fixed to the linking body 55 through welding 59 or brazing. The connection of the spherical joint to the outside system is provided through threaded stud 60 on the ring 56.

Those differences outlined in the preceeding paragraphs are the only differences between the embodiments in FIGS. 1 and 2 and FIGS. 3 and 4 respectively.

The spherical joint in a third preferred embodiment is shown in FIGS. 5-8. This joint has external forced lubrication, working in a closed space, and is a cylindrical type joint as a result of the limitation of two degrees of freedom of the internal coupling 36, such as, for example, by a joint between a piston with a combustion chamber and its connecting rod. The main supporting body 1 becomes the upper end of the connecting rod 61. The lower bearing assembly 3 becomes a lower bearing assembly 62 and upper bearing body 2 becomes a combustion chamber assembly 63.

Figure 5:
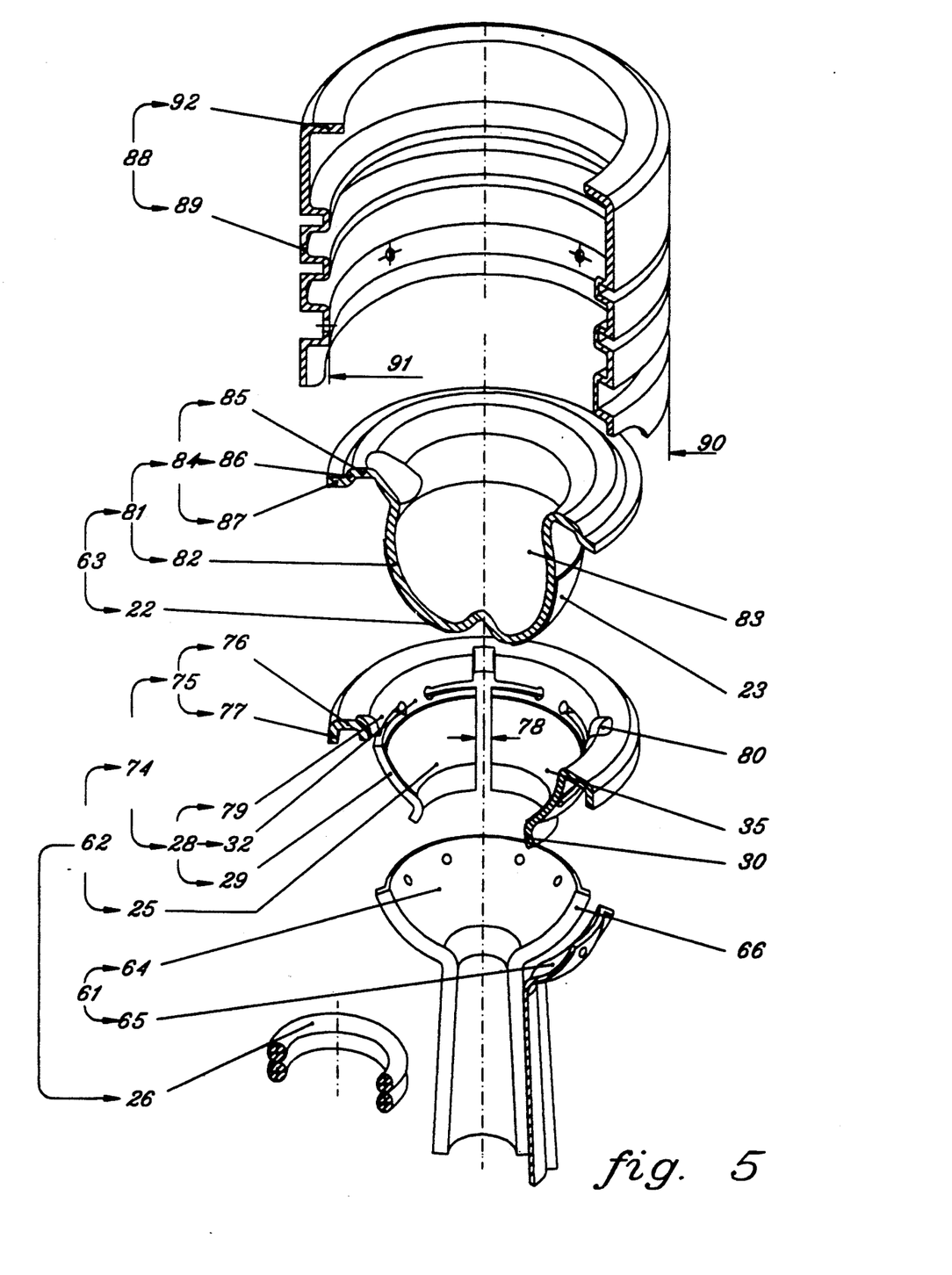
FIG. 5 is an exploded view of a second embodiment of a the spherical joint as applied to a piston and connecting rod assembly.
Figure 6:
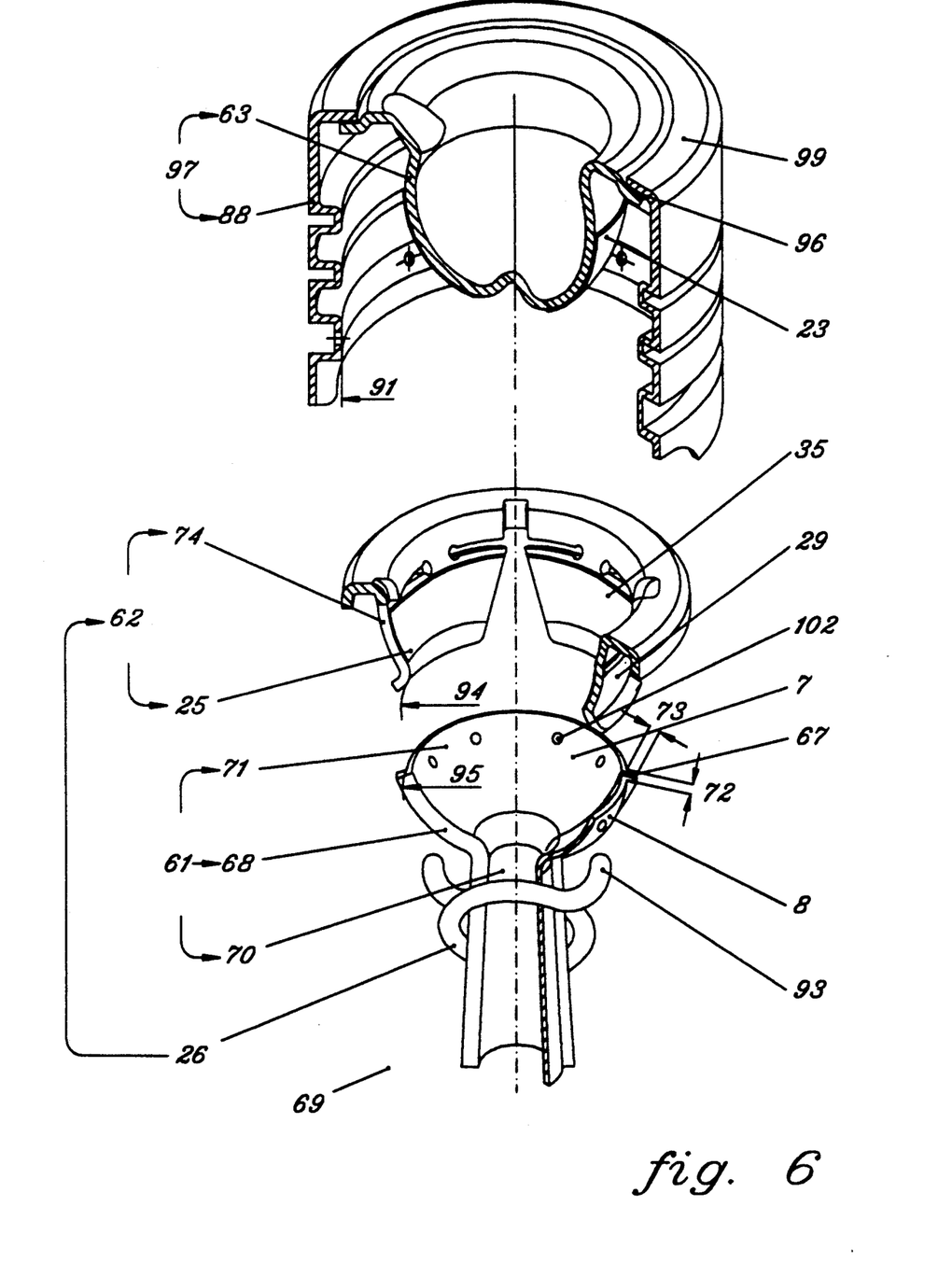
FIG. 6 is an exploded view of the spherical joint, according to FIG. 5, partially assembled.

The upper end of connecting rod 61 shown in FIGS. 5 and 6 functions as the main supporting body 1, and is composed of two bodies 64 and 65 which are membrane type bodies rendered into their final shape from sheet metal using the plastic deformation or stamping processes. The bodies 64 and 65 are cup-shaped, open at their ends, and symmetrically face one another. They are bordered on each side by ridges 66, and welded together to form the upper end of connecting rod 61 with the welding 67 on the ridges 66. As a result, two rigid edges 68 are located on each side which are situated in the plane 69 of the angular motion of the connecting rod 61. The upper end of connecting rod 61, has a connecting section 70, a supporting section 71 with active surfaces 7 and 8, all with the same functional roles as described above with respect to the first embodiment. The rigid edges 68 function to stiffen the connecting section 70 and also limit two degrees of freedom of the connecting rod 61 at the supporting section 71 level. The rigid edges 68 have a width 72 and a height 73 appropriately dimensioned in relation to the lower bearing assembly 62.

The lower bearing assembly 62, according to FIGS. 5 and 6, has the same function in the spherical joint as the lower bearing assembly 3 of the first embodiment described above and comprises a radial spring 26, and a hemispherical shape zone including a number of lobes 29 equispaced on a hemispherical area, covered on their concave side with antrifriction material 25 to define an active elastic hemispherical surface 35. The bearing assembly 62 also includes a lower bearing body 74 having a different construction then the lower bearing body 27 in the first embodiment. The mounting flange 75 has a radial flange 76 which is continued with a cylindrical flange 77 oriented to supporting section 28, and the supporting section 28 has an even number of lobes 29 (at least four) with an opening 78 between each pair of lobes 29 which is bigger than the width 72 of the rigid edge 68. The lobes 29 including antrifriction material should be thicker than the height 73 of the rigid edge 68. The connecting zones 79 include local recesses 80 which clear the rigid edges 68, thus stiffening the mounting flange 75 and permiting the circulation of the lubricant 53.

The combustion chamber assembly 63 shown in FIGS. 5 and 6 has the same functional role as the upper bearing assembly 2 of the first embodiment and contains on the active convex surface 23 an antifriction material 22 which also has a thermal isolation function. The chamber assembly 63 has a combustion chamber body 81 which is different from the upper bearing body 21. A supporting section 82 is closed at its lower end and defines an open cavity or combustion chamber 83 only at its upper end and presents on its convex side a hemispherical zone which becomes the hemispherical active surface 23. A mounting section 84 has a radial type flange 85 continued as a step 86 with another radial mounting flange 87 orientated towards supporting section 82.

The piston skirt 88, shown in FIGS. 5 and 6, has the same function in the spherical joint a the linking body 4 of the first preferred embodiment and comprises a cylindrically shaped mounting section 89 ensuring through its external cylindrical surface 90 a sliding connection of the joint to the driving system. An internal cylindrical shaped surface 91 permits the rigid mounting of the lower assembly 62 to the piston skirt 88 The piston skirt 88 also contains an upper mounting radial flange 92, situated on the internal cylindrical surface 91 and facilitates the rigid mounting of the combustion chamber assembly 63 to the piston skirt 88.

Figure 7:
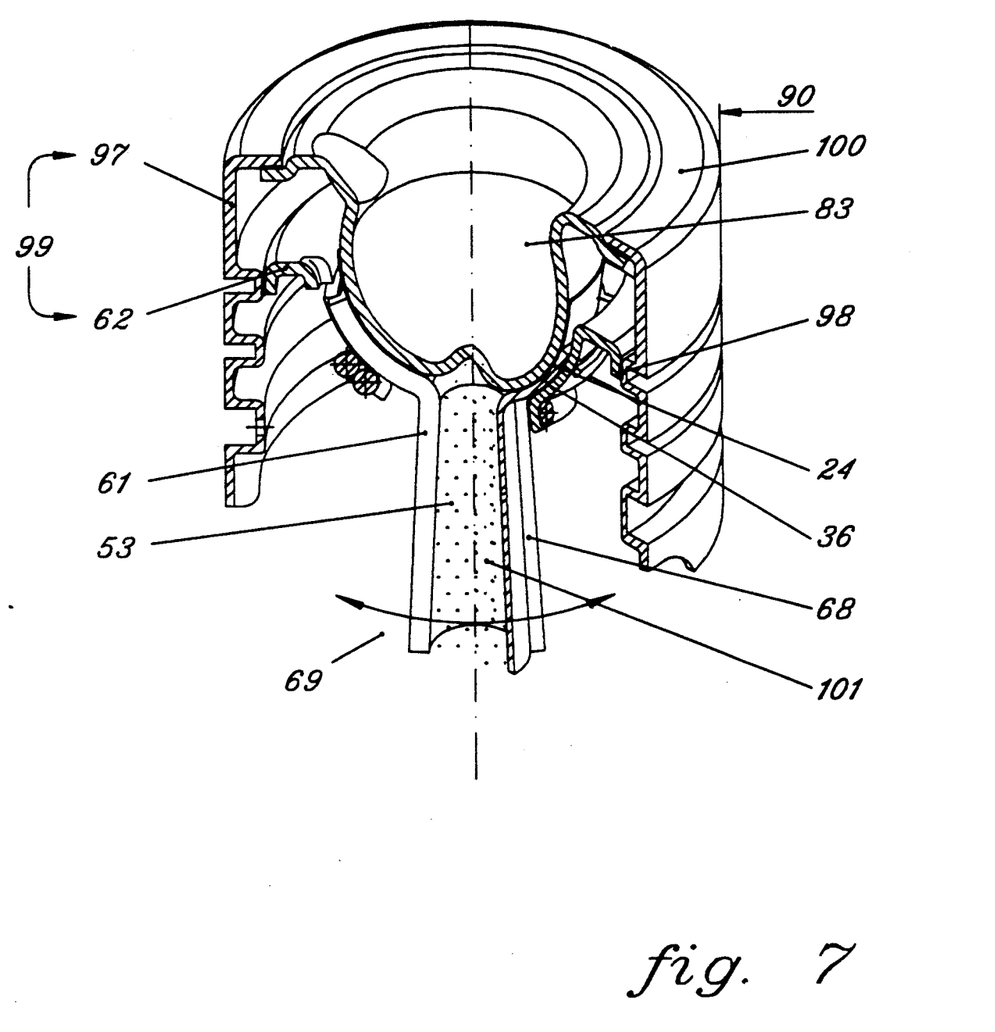
FIG. 7 is a side elevation view, partially in section, of an assembled spherical joint according to FIG. 5.

The assembling of the spherical joint shown in FIGS. 5, 6 and 7 starts with the forced unwinding of the last coil end 93 of the radial spring 26 and introducing it on to the connecting section 70 of the small upper of the connecting rod 61. The radial spring 26 is rotated around the connecting rod axis so as to wind coils of the spring on the connecting rod under the supporting section 71. The lobes 29 of the lower bearing body 74 are then spread to reach a diameter 94 equal to or bigger than diameter 95 to permit the mounting of the cup-shaped supporting section 71 inside of the lower bearing body 74. The combustion chamber assembly 63 is joined by welding 96, riveting or brazing to piston skirt 88 resulting in a piston body 97.

The assembling of the spherical joint continues with the bringing together of the active concave hemispherical surface 7 and the active convex hemispherical active surface 23 generating an external coupling 24. The active hemispherical concave surface 35 is brought together with the active hemispherical convex surface 8 such that the rigid edges 68 fit in the openings 78 between the lobes 29, generating an internal coupling 36. In this position, the lower bearing body 74 is assembled through welding 98 riveting or brazing with the piston body 97. The lobes 29 are brought together and tightened with the radial spring 26 which is mounted over the steps 30.

The assembly, as described above, results in a rigid piston 99 composed of piston body 97 and the bearing assembly 62. The pressures applied to the piston 99 at the piston head 100 are transmitted through the spherical joint and connecting rod 61 to the driven system.

The continuing compensation against the existing wear and the concentricity deviations at the external and internal couplings 24 and 36 is achieved in the same way as in the first embodiment of the present invention, described above.

The spherical joint of the present invention has an external forced lubrication in which the lubricant 53 is pumped through the cavity 101 of the upper end of the connecting rod 61 and circulates to the inner part of the external coupling 24 at its lower side. The adherence of the moving oil film to the walls has a role in cooling the combustion chamber assembly 63, the piston head 100 and partially the piston skirt 88. The moving oil film circulates through some pressure equalizing openings 102 situated on the supporting section 71 of the upper end of connecting rod 61, between the surfaces of the internal coupling 36, and has the role of lubrication and cooling. The lubricant 53 circulates through the recesses 80 of the lower bearing body 74.

Figure 8:
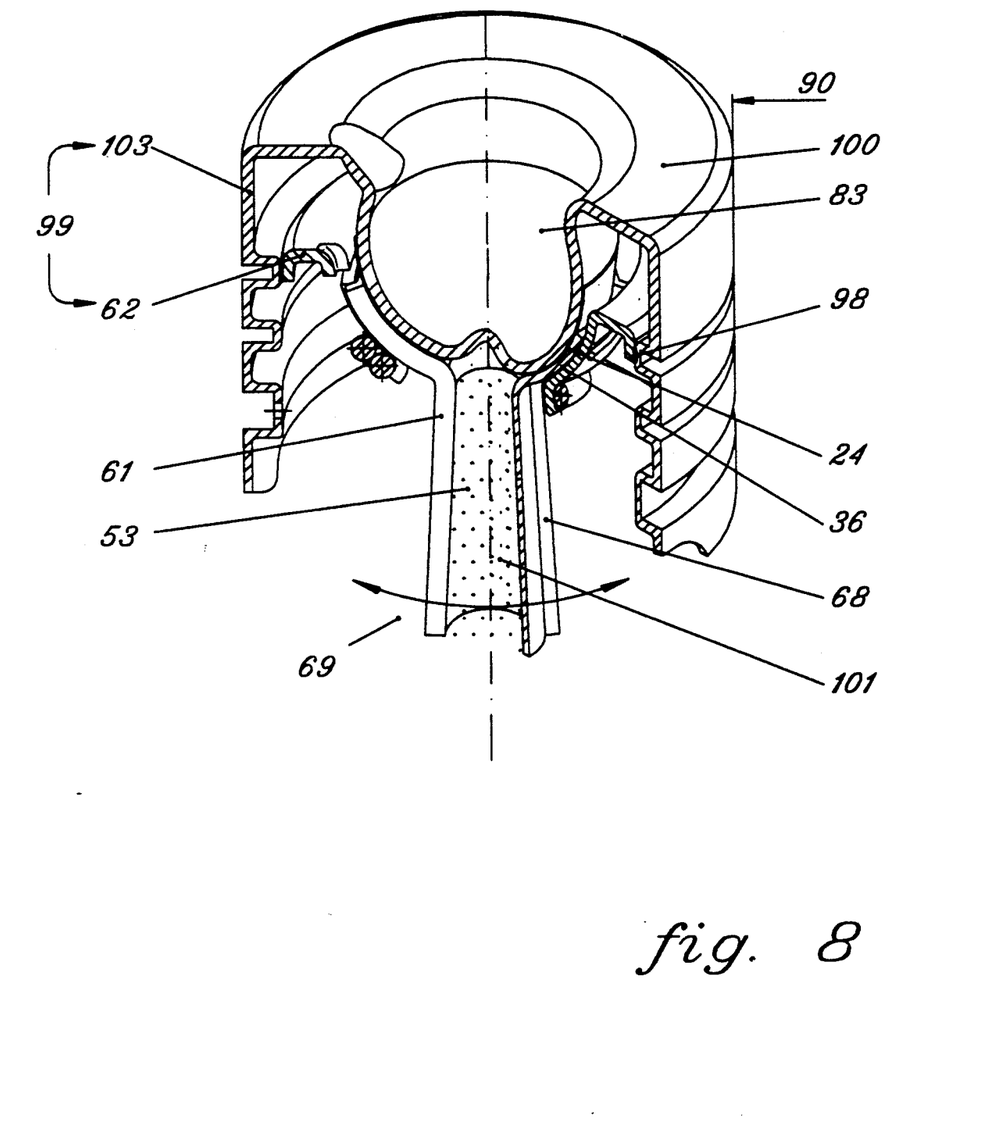
FIG. 8 is a side elevation view, partially in section, of an assembled spherical joint according to FIG. 5, in another embodiment of a piston head.

In another example of the embodiment shown in FIGS. 5 and 8, the piston skirt 88 and the combustion chamber assembly 63 are combined at the mounting flange 92 and mounting flange 84 area and results in a new piston body 103 which is also a membrane type body which can be manufactured through high precision casting or sinterization of the metallic or ceramic materials, or sheet metal stamping.

The spherical joint has a homogenous structure composed of a main supporting body, which enables connection to the driven system, an upper bearing assembly which may comprise a combustion chamber assembly and a lower bearing assembly fixed together with a linking body, such as a piston skirt, and ensuring the connection with the driven system. All of the above are built mainly of membrane type bodies, obtained by plastic deformation, precision casting, or stamping from a variety of materials including ferrous, nonferrous, ceramics or others.

What is claimed is:

1. A spherical joint comprising:
   a main supporting body;
   an upper bearing assembly for coupling with the main supporting body;
   a lower bearing assembly for coupling with the main supporting body;
   a linking body;
   an enclosing assembly;
   wherein the main supporting body, upper bearing assembly and lower bearing assembly define two pairs of active hemispherical surfaces, a first pair defining an external coupling between the upper bearing assembly and the main supporting body, and a second pair defining an internal coupling between the main supporting body and the lower bearing assembly, one of the active surfaces having elastic properties defined by a plurality of spring-loaded lobes, the external and internal couplings compensating for wear and deviation from concentricity between the main supporting body and the upper bearing assembly and lower bearing assembly, the spherical joint, in use, creating forced lubrication between the pairs of hemispherical surfaces by a pumping effect generated by oscillating movement of the main supporting body.

2. A spherical joint as claimed in claim 1 wherein the main supporting body is comprised of supporting section, a connecting section attached thereto, the supporting section having an active external surface which couples with the lower bearing assembly and an active internal surface which couples with the upper bearing assembly.

3. A spherical joint as claimed in claim 2 wherein the main supporting body is composed of two bodies symmetrically facing each other, the two bodies having ridges at each end thereof welded together to form a pair of rigid edges on each side of the connecting section, the edges stiffening the connecting and supporting sections and restricting the degree of movement thereof.

4. A spherical joint as claimed in claim 3 wherein the ridges are located between openings between two lobes in the lower bearing assembly.

5. A spherical joint as claimed in claim 1 wherein the upper bearing assembly comprises an upper bearing body having a cup-shaped supporting section having a convex surface, the convex surface comprising an active surface which couples with the main supporting body, an antifriction material on the active surface, the convex surface on the cup-shaped supporting section coupling with the main supporting body to provide the external coupling.

6. A spherical joint as claimed in claim 1 wherein the lower bearing assembly has a lower cup-shaped bearing body with a supporting section including elastic properties, the lower cup-shaped bearing body having at least three lobes of hemispherical shape, each lobe having at its lower edge a step for receiving a radial spring, each lobe further having at its upper edge a deformation for receiving an elastic ring, each lobe being covered on a concave side thereof with antifriction material to produce an active hemispherical surface, said surface cooperating with one of the active surface on the main supporting body to form the external coupling.

7. A spherical joint as claimed in claim 6 wherein the lower cup-shaped bearing body has four lobes.

8. A spherical joint as claimed in claim 6 wherein the lower cup-shaped bearing body and lobes are joined at an upper side thereof to a common body, there being provided a plurality of flexible zones to facilitate oscillation of the lobes, the lower bearing body further comprising a mounting flange.

9. A spherical joint as claimed in claim 8 wherein a radial spring is secured to the lobes, the radial spring and lobes being selected to produce a predetermined pressure so that all four active surfaces are able to slide over each other and compensate for wear and deviations of concentricity at the external and internal couplings.

10. A spherical joint as claimed in claim 1 wherein the linking body has an upper cylindrical mounting section and a mounting flange, the mounting flange having a diameter so as to correspond with a registering mounting flange on the lower bearing assembly.

11. A spherical joint as claimed in claim 10 wherein the lower bearing body and the linking body are formed as single body.

12. A spherical joint as claimed in claim 1 connected to an outside system by a piston skirt.

13. A spherical joint as claimed in claim 1 wherein the upper bearing assembly has a dome-shaped cover, a plug is located to seal the main supporting body, a rubber bellows is attached about the lower bearing assembly, and the rubber bellows is secured by upper and lower elastic rings.

14. A spherical joint as claimed in claim 1, wherein each active hemispherical surface is selected such that the pair defining the internal coupling and the pair defining the external coupling are chosen so that he surfaces on the main supporting body are in contact with a bigger supporting area on the lower and upper bearing assemblies respectively, the contact areas being displaced maximally from a longitudinal axis of the spherical joint thereby creating the ability for the joint to compensate for radial wear at the internal and external couplings through relative axial movement of the active surfaces relative to each other.

15. A spherical joint as claimed in claim 1 comprising a closed lubrication circuit system.

16. A spherical joint as claimed in claim 15 wherein the closed lubrication circuit system includes an internal cavity of the main supporting body and of the upper bearing body, and a toroidal chamber located above the internal coupling, wherein the lubrication circuit system can contain a lubricant with a maximum level above the external coupling and circulating through a window between the active surfaces, there being a moving lubricant film which accumulates in the toroidal chamber and acts as a storage space for the lubricant, from which the lubricant is recirculated in the internal cavities through a plurality of holes situated in the walls of the upper bearing body, the moving lubricant film being formed between the active surfaces of the external and internal couplings and thereafter accumulating in a rubber bellows which acts as a storage space for the lubricant.

17. A spherical joint as claimed in claim 16 having an external forced lubrication circuit wherein lubricant is pumped through the internal cavity of the main supporting body, circulates to the external coupling, and facilitates cooling of the combustion chamber, a piston head and piston skirt, the moving oil film circulating through pressure equalizing openings in the supporting section between the surfaces of the internal coupling, providing lubrication and cooling.

* * * * *